W. O. HAYTER AND G. A. FRISK.
JAM NUT.
APPLICATION FILED AUG. 31, 1920.
1,394,730.
Patented Oct. 25, 1921.
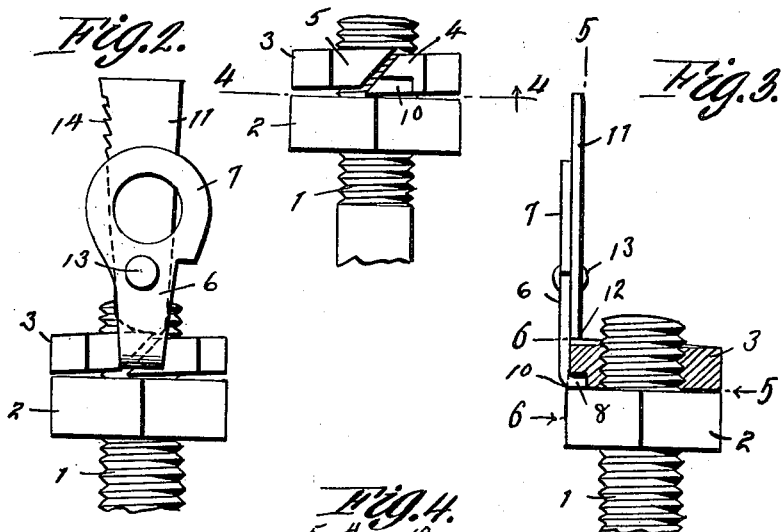
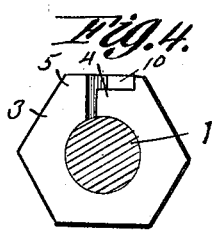
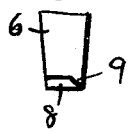
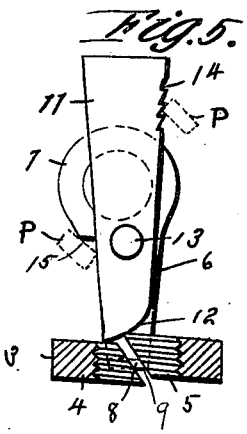
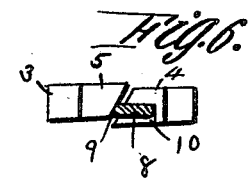
WITNESSES
WILBUR D. HAYTER INVENTORS
and
Gust. A. Frisk.
BY
ATTORNEY.

UNITED STATES PATENT OFFICE.

WILBUR O. HAYTER, OF KLAMATH FALLS, OREGON, AND GUST A. FRISK, OF GRIDLEY, CALIFORNIA.

JAM-NUT.

1,394,730.  Specification of Letters Patent.  Patented Oct. 25, 1921.

Application filed August 31, 1920. Serial No. 407,113.

*To all whom it may concern:*

Be it known that we, WILBUR O. HAYTER and GUST A. FRISK, citizens of the United States, residing at Klamath Falls and Gridley, respectively, in the counties of Klamath and Butte, respectively, and States of Oregon and California, respectively, have invented certain new and useful Improvements in Jam-Nuts, of which the following is a specification.

This invention relates to nut locking devices and has for its principal object to provide a locking member designed to be threaded on the shank of a bolt, rearwardly of the nut and formed so as to frictionally grip the threads of the bolt so as to prevent any backing off of either the nut or the locking member itself.

A further object of the invention is to provide a self locking member normally tending to bind itself to the threading of the bolt and provided with means for loosening its grip on the threads, to prevent screwing or unscrewing of the lock device from the bolt.

As an additional object the invention contemplates the provision of an improved key means designed to be applied to locking devices of the above character whereby the grip of the locking member may be sufficiently loosened to permit either removal thereof from the bolt or further adjustment thereon.

With the above and other objects in view, the invention resides in the details of construction, combination and arrangement of parts as will be hereinafter more fully pointed out, reference being had to the accompanying drawings wherein—

Figure 1 is a view illustrating the application of the locking device,

Fig. 2 is a similar view with the key or loosener in place.

Fig. 3 is a vertical sectional view.

Fig. 4 is a horizontal cross section taken on the line 4—4 of Fig. 1.

Fig. 5 is a section taken on the line 5—5 of Fig. 3.

Fig. 6 is a sectional view taken on the line 6—6 of Fig. 3 and disclosing the manner in which the beveled edge of the key device is received in the slotted portion of the locking nut and Fig. 7 is a fragmentary detailed view of the footed end of the key.

In the drawings, 1 indicates the threaded shank of a bolt and 2 a nut screwed thereon. The locking device forming our invention is provided in the shape of an additional nut member much smaller in size than nut 2 and of spring steel or other elastic material so that it has the necessary resiliency required for a locking device of this character. This lock nut 3 is threaded for engagement with the shank 1 of the bolt and is severed on one side by a diagonally extending slot as shown, thus forming beveled edged ends 4 and 5 respectively. These end portions are bent or sprung so as to normally work away from each other in a laterally offset direction and are normally kept in closely spaced relation by the contracting tendency of the locking nut. This contracting tendency results in the inside diameter of the nut being slightly smaller than the diameter of the threaded shank of the bolt with the result that when the locking nut 3 is threaded thereon it becomes slightly expanded against its own resilient or contracting tendency. The threads of the nut are thus caused to firmly adhere to and grip the threads of the shank. As the ends 4 and 5 are sustained in an offset or distorted position relative to one another, it is evident that after they have been brought into alinement so as to grip the threads of the bolt and then released that the tendency to resume their offset position will cause or produce a binding stress between the threads of the locking member and the bolt threads sufficient to bind the locking member in place.

The locking member may be screwed up snugly against the nut 2 by the application of a wrench in the usual manner and will automatically lock itself firmly to the threads of the bolt so as to prevent any backing off of either the nut or the lock device itself.

To provide for the adjustment of the locking nut or its removal from the bolt, an unlocking key or loosener is provided and as shown comprises a pair of pivotally connected parts designed for coöperation with the locking nut as hereinafter described. One of the pivotal members of the key consists of a strip having a tapered shank 6 and an enlarged annular shaped head 7 forming a convenient finger grip for the convenient handling of the key. The lower end of the tapered shank 6 is turned inwardly at right angles to provide a foot 8 having a beveled edge 9 as shown to advantage in Fig. 7 of the drawing. The foot 8 is designed to be received within a groove or recess 10 cut into the inner face of the end 4 of the locking nut 3 and opening laterally of the nut and adjacent to the slot thereof as shown to advantage in the drawing. When the foot 8 is inserted in this recess or groove, the beveled edge 9 as will be noted from Fig. 6 of the drawing, is positioned forwardly a slight distance beyond the beveled surface of the end 4 and is in snug engagement with the beveled surface of the opposite end 5. The foot thus constitutes a wedge shaped guide and bearing surface on the end 5 so that when the latter is forced downwardly by the lever action of the key, it will also be forced outwardly from the end portion 4 thus expanding the nut and loosening its grip upon the threads of the bolt. The second part of the key consists in a lever forming strip 11 provided with a lower, curved or beveled bearing edge 12. This lever is pivoted to the shank 6 of the finger strip by means of a rivet or other suitable fastening means 13. One edge of the lever is provided with a series of notches 14 which are located adjacent the upper end of the lever.

The finger grip 7 has a portion thereof cut away adjacent the pivot 13 and on a side opposite to the notches 14 so as to provide a shoulder 15. These notches and the shoulder are for the purpose of providing means for allowing the jaws of a pair of pliers P or other similar tool to obtain a firm hold for operating the key in a manner hereinafter explained.

In the application of the invention, the locking nut 3 is screwed upon the shank of the bolt after the nut has first been screwed into place. To apply the locking nut 3 it is necessary that the ends 4 and 5 be brought into alinement in order that the interrupted threads may register one with the other for appropriate engagement with the threads of the bolt, otherwise, the locking device would cross thread the latter. To bring the locking nut into position for threading on the bolt, the beveled foot 8 of the key is inserted in the recess 10 of the locking nut and the lever 11 moved about its pivot until it assumes a vertical position approximately as shown in Fig. 5 of the drawing, with its beveled edge 12 resting against the raised end 5 of the nut as shown. A pair of pliers or other such tools could then be employed and is arranged so that one jaw engages the notches 14 and the other engages the shoulder 15 as illustrated by the dotted line structure of the figure just referred to. Upon bringing the jaws of the pliers together, the lever 11 will be caused to swing on a pivot 13 so that the beveled edge 12 forces the raised end 5 downwardly and outwardly along the beveled edge 9 of the foot 8 until the locking nut has been sufficiently expanded to be suitably threaded upon the shank of the bolt, the threads of the locking nut being approximately in register for appropriate communication with the threads of the former.

The clamping action of the jaws of the pliers would tend, it is obvious to draw the foot 8 firmly up against the top wall of the recess during the time that the beveled edge of the lever member of the key is forcing the raised end 5 downwardly. And since the end is forced downwardly against its own resilient tendency, its resistance to the pressure of the lever is sufficient to bind the same after it has been pivoted to a certain degree, so that the pliers may subsequently be disengaged from the key without causing dislodgment of the key from the locking nut. As thus provided the locking nut may be threaded upon the bolt after the usual manner of a nut and by the application of a wrench until it has been screwed up to the nut 2. A slight blow on the upper unnotched edge of the lever is sufficient to move the latter enough to release the key from the locking nut, thus leaving the latter free to its expansive action against the threads of the nut. The strain or binding stress which is thus produced between the threads of the bolt and the threads of the elastic portions 4 and 5 of the locking nut will effectively prevent the locking nut from being shaken or jarred off of the bolt. The latter thus becomes firmly anchored in place and cannot be removed even by the application of a wrench, without distorting or destroying the threads of the bolt, since any attempt to unscrew the locking nut, without first attaching the key in place as previously described would only result in the threads of the ends 4 and 5 cross cutting the threads of the bolt causing the locking device to become jammed and distorted. To properly remove the locking device or to adjust it further on the shank of the bolt, the key means must be fastened in place as previously explained so that the locking nut will not only be expanded slightly but the ends 4 and 5 will be drawn into alinement with each other so as to remove the binding stress between the threads of the locking nut and the threading of the bolt. After this has been done, the turning of the locking nut, in either direction is quite a simple matter and the device can then be easily and readily screwed onto or off of the bolt.

From the foregoing description it may therefore be seen that the present invention provides a device which can be adjusted for holding an ordinary nut in any place on the bolt and which is self locking in a most positive manner; being capable of adjustment or removal, however, only by the application of associate key means.

Having thus described the invention what we claim as new and desire to secure by Letters Patent is:—

A locking nut comprising a flat polygonal body having a screw threaded opening extending therethrough, said nut having a slit extending in a plane diagonal to the axis of the opening to provide overlapping acute angled outer and under portions, the said portions being displaced longitudinally of the axis of the opening with respect to each other, the under porton having a recess extending from the side of the nut inward toward the opening whereby one jaw of a clamping tool may be inserted in said recess and the other jaw applied to the face of the outer overlapping portion to draw said portions toward each other.

In testimony whereof we affix our signatures.

WILBUR O. HAYTER.
GUST A. FRISK.